Dec. 20, 1966  G. J. FAN  3,293,564
CONICAL ENERGY REFLECTING COUPLING DEVICE
Filed Dec. 30, 1963
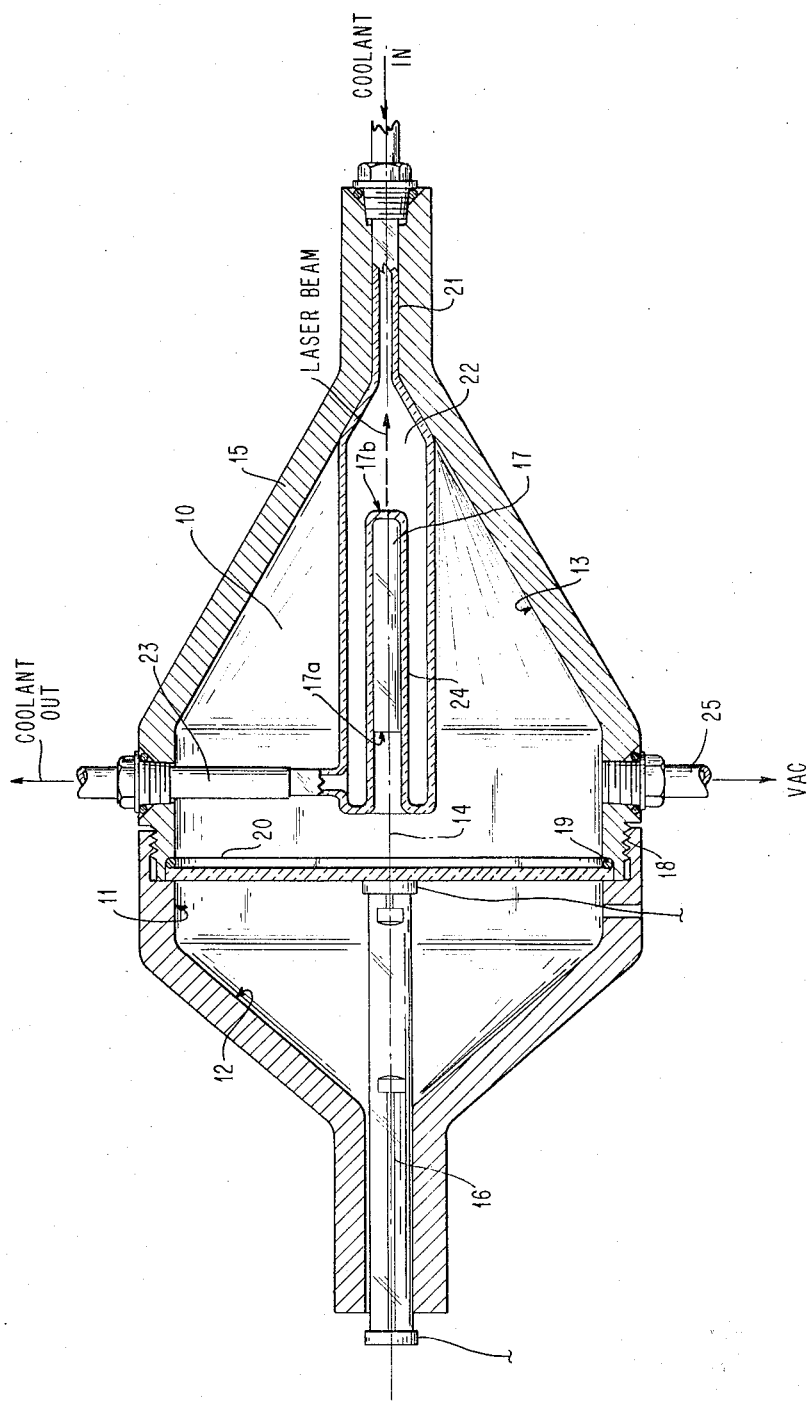
INVENTOR.
GEORGE J. FAN
BY *Robert E. Sandt*
AGENT United States Patent Office 3,293,564
Patented Dec. 20, 1966

3,293,564
CONICAL ENERGY REFLECTING
COUPLING DEVICE
George J. Fan, Ossining, N.Y., assignor to International Business Machines Corporation, New York, N.Y., a corporation of New York
Filed Dec. 30, 1963, Ser. No. 334,401
1 Claim. (Cl. 331—94.5)

This invention relates to radiation directing cavities, and more particularly to improvements in the geometric configuration of a reflecting cavity for directing the excitation energy from a radiation source to stimulate emission in an optical laser element.

In a pumped optical laser system, it is desirable to achieve a maximum transfer of energy from the excitation lamp to the active lasing element. Frequently, close coupling of the lamp and the laser element results in the transfer of unwanted energy forms in addition to the desired stimulating energy. Too close coupling, such as enclosing the elements in a reflecting foil wrap, produces undue, and frequently destructive, heating in the lasing element, as well as placing the element in a very strong magnetic field generated by the high currents employed in the excitation lamps. Since heat and other energy forms are undesirable, any laser system design must necessarily take cognizance of the transfer of these energies and seek to minimize their effect while maximizing the effect of the desirable energy forms.

Heat and magnetic field effects can be controlled by physical isolation of the parts, by sheilding, by cooling (against heat damage), or by combinations thereof. Necessarily, however, these cures depend upon at least a minimum separation of the lamp and the laser element so as to provide room for the insertion of shields or cooling apparatus. Since physical separation of the lamp and laser necessarily diminishes the transfer of the stimulating energy, some form of reflecting cavity must be provided to compensate for the lack of intimate contact between the two elements.

As the separation between the lamp and the laser becomes greater, the cavity configuration becomes more important. Whereas a simple foil wrap is sufficient for a juxtaposed lamp and laser, a specially shaped cavity is required for the physically separated elements. It might appear, as it has to some prior art investigators, that a cavity having focusing properties with the energy source and the laser at conjugate focal points thereof would be the most efficient cavity shape. The focusing cavity, however, is not so efficient it might appear on casual study. Although the lack of point (or line) sources of illumination, and point (or line) laser targets does detract somewhat from the theoretical high efficiency of the focusing cavity, a far greater factor tending to degrade its efficiency is the lack of absorption of the laser itself. Of the energy incident on the laser, it is estimated that only about 20% is absorbed, and 80% passes through. If this 80% is lost, then a stronger source must be employed to attain the energy threshold necessary to stimulate the laser into emission. In the focusing cavity, the nonabsorbed (80%) energy is focused back to the source where its only contribution is to heat the exciting lamp.

The cavity of the instant invention has been designed with full recognition of this lack of absorption. The energy which is lost on the first pass is repeatedly redirected back into the laser element for absorption of 20% of that energy which has been returned to the laser. While no attempt will be made to provide any mathematical analysis of the energy absorbed, it should at least be qualitatively apparent that the energy absorbed in two passes is greater than that absorbed in one. Thus, some efficiency must be gained by the multiple pass of energy through the laser. While reflection from a surface is not 100% efficient, the wall reflection losses within the cavity are more than offset by the increased absorption. The cavity, therefore, seeks to trap all light in the cavity and direct it towards the active laser element by a sort of trapping action. Even the light passing through the laser is directed back into the laser. In addition to an increase in the coupling efficiency between the lamp and the lasing element, the two devices are sufficiently separated so as to decouple them magnetically and to provide sufficient room for heat dissipating devices.

In addition to achieving the advantage as set forth above, it is a more specific object of this invention to provide a novel configuration of a reflecting cavity for directing radiant energy from a source to a target by successive reflections from the cavity surface so as to always direct the energy from the source to the target, and to redirect the energy not absorbed by the target back toward the target.

A further object is to provide an improved configuration for a reflecting cavity which efficiently couples the energy from a radiant energy source of finite size to a target of finite size by multiple reflections from the cavity, wherein radiant energy within the cavity, including energy not absorbed by the target, is always directed toward the target.

Another object of the invention is to provide an improved configuration for an optical cavity for coupling the pumping energy from a light source to a laser element to stimulate emission therein.

Yet another object is to provide an improved configuration for an optical cavity for coupling the pumping energy from a light source to a laser element to stimulate the emission therein, in which cavity the tubular light source and the laser element are coaxially disposed to minimize the effect on the laser of stray magnetic fields generated by the lamp.

Still another and specific object of the invention is to provide an optical reflecting cavity for coupling the energy from a tubular lamp to a rod-like laser element wherein the cavity is comprised of two coaxial internal conical reflecting surfaces joined by an internal coaxial cylindrical reflecting surface, the lamp and the laser being disposed within the conical portions of the cavity coaxial therewith.

The foregoing and other objects, features and advantages of the invention will be apparent from the following more particular description of a preferred embodiment of the invention, as illustrated in the accompanying drawing, which is a cross section view taken on the axis thereof.

Considering first the basic features and elements of the invention, as illustrated in the drawing, it will be seen that the reflecting cavity 10 consists of the coaxially disposed internal conical reflecting surfaces 12 and 13 joined by the cylindrical surface 11. These surfaces are formed in the housing 15 by suitable machining and polishing operations to achieve a highly reflective surface. The exciting lamp 16 and the active laser element 17 are disposed within the cavity in coaxial end-to-end relationship. With these basic elements in the relative configuration illustrated, light radiating from the lamp 16 will be directed by multiple reflections to stimulate the laser element 17 to emit its characteristic radiation.

While the configuration of the cavity 10 and the relative disposition of the lamp 16 and laser element 17 are not critical, these are limits beyond which the efficiency of the apparatus falls off markedly. It is expedient, therefore, to start with a given lasing element which is desired to be stimulated and premise the dimensions of the other elements thereon. For a given active laser element 17 having a length of L and a diameter D, the lamp 16 would be chosen to have an arc path of comparable length and diameter and would be chosen from the nearest commercially available size of an arc discharge lamp of the mercury xenon type or equivalent. The cavity 10 would be proportioned with the cylindrical surface 11 having its radius and length equal to L, the conical surface 12 formed with an angle of 120°, and the conical surface 13 formed with an angle of 45°. The lamp 16 is inserted into the apex of the conical surface 12, while the lasing element 17 is spaced away from the apex of the surface 13 by a distance of L/4 to L/2. The foregoing dimensions represent the median in a range, particularly with respect to the angular dimensions. For these, the conical angle of the surface 12 may range from 100° to 140° while that of the surface 13 from 30° to 60°. The linear dimensions may also vary within limits, but those set forth are preferred.

With the relative dimensions set forth above, light from the lamp 16 will be reflected from the surfaces of the cavity 10 and directed toward the laser 17. Some rays will be directed with only a single reflection, while other rays will require multiple reflections before impinging on the laser element 17. The light which passes through the laser 17 without being absorbed, instead of being directed back to the lamp 16, will be directed principally by the conical surface 13 back into the laser element 17.

While the analysis of the optimum configuration for the cavity involves extremely complex mathematics with multiple integration, it has been found that with the parameters set forth efficient operation will be achieved. For example, with a neodymium doped glass laser 40 mm. long, and a lamp having a 6 mm. diameter and 40 mm. arc length, it was only necessary to supply 27 joules to the lamp to provide the necessary pumping energy to the laser.

While the geometric features of the cavity of the invention have been discussed, the derived benefits and ancillary hardware have been neglected. Actually, the housing 15 is constructed of two parts threaded together at the joint 18 with an intervening gasket 19 and sheet of glass 20. The glass 20 can be eliminated, but if employed, is fabricated of heat absorbing glass and coated with a non-reflecting film. The glass 20 serves as a window to isolate the cavity into two chambers. This isolation permits the lamp 16 to operate efficiently at its elevated temperature, while the laser 17 is cooled. Cooling fluid is introduced through the tube 21 forming the exterior wall of the double-walled container 22 with its exit duct 23. The annular space containing the circulating coolant surrounds the inner chamber 24 into which the laser element 17 fits. The container 22 is fabricated of glass to permit the passage of the pumping energy from the lamp 16 as well as the stimulated emission from the laser rod 17. To provide for the transmission of the stimulated emission from the laser 17, the end surfaces 17a and 17b are polished and made highly reflective. The surface 17b is less reflective so that the light from the laser is transmitted through the surface 17b and outside the cavity 10 through the external transparent coolant pipes.

The vacuum connection 25 permits evacuation of the right side of the cavity, principally to reduce condensation of any moisture on the window 20, but also to provide a heat insulator for the laser 17 and thus improve the cooling thereof.

The clamp 16 is a commercial mercury xenon arc discharge lamp and is loosely fitted in the neck of the housing 15. The lamp would normally be fabricated with an extended neck on one end to permit the arc path to be totally enclosed within the cavity.

While the invention has been particularly shown and described with reference to a preferred embodiment thereof, it will be understood by those skilled in the art that various changes in form and details may be made therein without departing from the spirit and scope of the invention.

What is claimed is:

An energy coupling device for repeatedly redirecting the radiating energy from a source of radiant energy to the irradiated target comprising:
  (a) an elongated source of radiant energy substantially cylindrical in configuration;
  (b) an elongated target substantially cylindrical in configuration to be irradiated by the energy from said source, the said source and the said target lying along a common axis spaced from one another;
  (c) and a reflecting cavity enclosing said source and said target comprised of an internal cylindrical reflecting surface having a ratio of length to diameter less than 3 and greater than 2, a first internal conical reflecting surface enclosing said source and having an apex angle less than 140° and greater than 100°, and a second internal conical reflecting surface enclosing said target and having an apex angle less than 60° and greater than 30°, whereby the energy radiated by said source is directed by multiple reflections from the reflecting surfaces of said cavity to said target, and the energy which is not absorbed by said target is repeatedly redirected by the surfaces of said cavity to said target for further absorption thereby.

References Cited by the Examiner

UNITED STATES PATENTS

| 3,152,245 | 10/1964 | Litman | 219—433 |
| 3,238,470 | 3/1966 | Mooney | 331—94.5 |

FOREIGN PATENTS

| 291,441 | 5/1929 | Great Britain. |

OTHER REFERENCES

Roess: "Radiofrequency Beats Between Components of Split Axial Modes in Ruby Lasers," Proceedings of the IEEE, vol. 51, No. 1, November 1963, pp. 1668–1669.

JEWELL H. PEDERSEN, *Primary Examiner.*

RONALD L. WIBERT, *Examiner.*